United States Patent [19]

Davies

[11] Patent Number: 5,227,884

[45] Date of Patent: Jul. 13, 1993

[54] PROCESSING OF VIDEO IMAGE SIGNALS

[75] Inventor: Trevor Davies, Henley-on-Thames, United Kingdom

[73] Assignee: Questech Limited, Wokingham, United Kingdom

[21] Appl. No.: 750,264

[22] Filed: Aug. 27, 1991

[30] Foreign Application Priority Data

Sep. 3, 1990 [GB] United Kingdom ................. 9019164

[51] Int. Cl.⁵ ............................................ H04N 5/262
[52] U.S. Cl. .................................. 358/182; 358/183; 358/181; 358/22
[58] Field of Search .................. 358/182, 183, 181, 22

[56] References Cited

U.S. PATENT DOCUMENTS 4,918,530  4/1990  Barton ................................. 358/183
4,974,083  11/1990  Bloomfield ......................... 358/183
5,010,407  4/1991  Trytko ................................ 358/183

Primary Examiner—James J. Groody
Assistant Examiner—Sherrie Hsia
Attorney, Agent, or Firm—Jacobson, Price, Holman & Stern

[57] ABSTRACT

A video image processing system includes a decay processor provided in a signal path via which a video key signal is recirculated through a frame store. The decay processor includes a selector switch for determining which of a plurality of signal paths having different signal modifying characteristics is included in the recirculation path. The selector switch is controlled by a pseudo random sequence generator, thus providing novel visual effects.

11 Claims, 4 Drawing Sheets

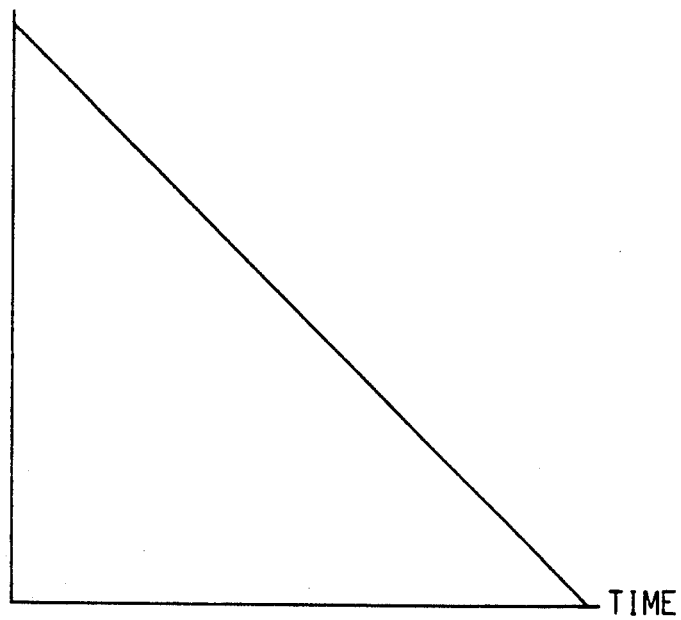
FIG. 2A  TYPICAL VARIATION WITH TIME OFF KEY SIGNAL INPUT TO LOOK UP TABLE
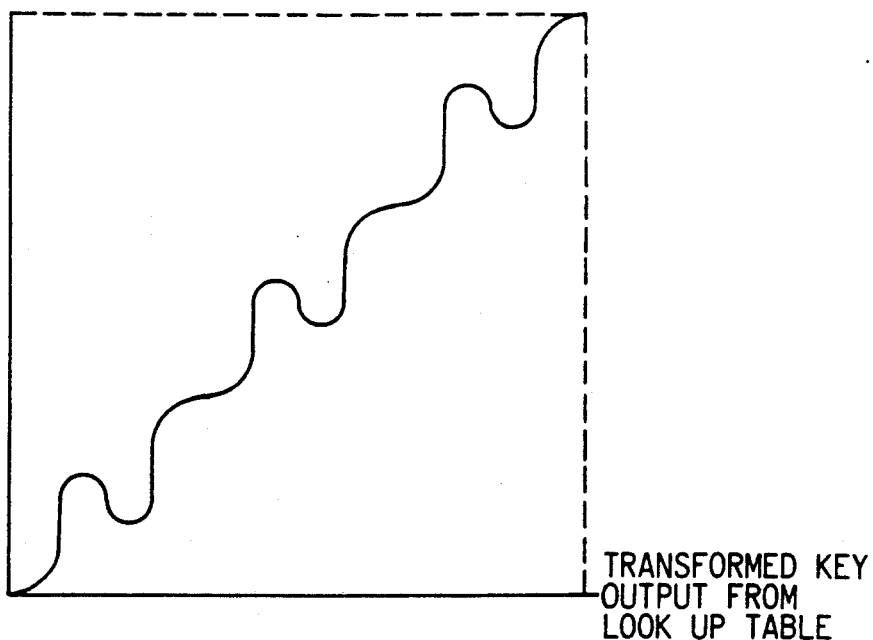
FIG. 2B  AN EXAMPLE OF ONE KEY SIGNAL TRANSFORMATION PERFORMED BY THE LOOK UP TABLE

PROCESSING OF VIDEO IMAGE SIGNALS

BACKGROUND OF THE INVENTION

This invention concerns improvements in the processing of video image signals to achieve a digital video effect known as 'decay'. In this effect a video image, or a part of a video image is caused to disappear with time in a variety of ways. This is achieved by processing the so-called key signal associated with a video image in order to vary the magnitude of the key signal associated with individual pixels or groups of pixels of the video image. For example the magnitude of the key signal can be reduced identically at every point of the image, to give a gradual decay, the key signal associated with groups of pixels may be reduced to form shaped holes in the image in a given sequence until the image disappears, or the key signal associated with individual pixels or groups of pixels may be reduced in a random manner to give a so-called random decay effect.

The processing of the key signal in the required manner is achieved by causing the key signal to be recirculated through a frame store via a path including a decay processor for processing the key signal, during the period of each frame of the video signal to be reproduced. Thus for the reproduction of each frame of the video image the corresponding key signal is read from the frame store and then returned to the frame store to be read again for the reproduction of the next frame. Since the key signal read from the frame store is modified by the decay processor before being returned to the store, a controlled decay is introduced into each consecutive frame of the video image in order to achieve the desired visual effect.

A drawback of the known arrangement, however, is that the range of decay effects that can be obtained is limited. It is impossible, for example, to make a decaying image appear to sparkle or to make it look as though it is reflecting light from random directions, like glitter.

SUMMARY OF THE INVENTION

It is accordingly an object of the present invention to provide an improved video image processing system that is capable of providing novel decay effects.

In accordance with the invention a video image processing system of the kind including a decay processor is characterised in that the decay processor incorporates a plurality of signal paths via which said key signal can be transmitted to, or derived from, the frame store, at least one of which paths incorporates decay processing means having a characteristic different from that of the or each other path, and that processor controlled selector switching means is provided for selecting a corresponding path of the decay processor through which each pixel of the key signal is to be transmitted. In one embodiment of the invention, for example, the decay processor may have two signal paths one of which incorporates a subtractor that reduces the value of the key signal by a fixed amount unless the key signal value is already zero, and the other of which is a direct path that transmits the key signal unchanged. The selector switching means may be controlled by means of a pseudo random sequence generator that is programmed to produce different probabilities that the respective paths will be selected. Alternatively the paths may be selected according to a predetermined sequence.

In accordance with a further preferred feature of the invention a further key signal processor is arranged to provide for transformation of the values of the key signal derived from the frame store. Such transformation may be effected, for example, by means of a look-up table, with the desired key transformation being selected by a microprocessor so that some key magnitudes are replaced by reduced values and some by higher ones.

The arrangement in accordance with the invention provides a new effect that allows each pixel or group of pixels to vary its magnitude with time by varying the key magnitude that corresponds to that pixel or group or pixels. The key for each pixel or group of pixels is made to follow a series of discrete values and each is incremented along that series at intervals in time determined by the appropriate sequence so that each pixel or group of pixels behaves differently. The series of values may be made to decrease and increase again several times before the sequence falls to zero; thus causing the associated pixels to fade and brighten several times before fading completely. Each pixel or group of pixels follows this course at its own pace and so there is always a variety of changing intensities apparent until all the pixels have gone.

One particular application of a decay processing system according to the invention is in the production of a decaying image trail caused to move across an image frame by means of an effect known as 'multifreeze'.

A prior arrangement for producing such an effect is described in U.S. Pat. No. 4,918,530, the disclosure of which is incorporated herein by reference, and comprises a frame store for receiving a video image signal together with a key signal defining an image area of the image represented by said video signal which is to be depicted against a background in an image frame, and means for processing such video image signals and key signals prior to storage in said frame store, said processing means comprising means for combining incoming image signals and key signals with respective image signals and key signals previously stored in said frame store and a decay processor for introducing a controlled decay into the combined key signal.

The prior arrangement referred to is capable of producing the effect of decaying trails appearing behind a moving area of the digital video image. In such an arrangement the framestore stores video luminance, chrominance and associated key. Video is written into that framestore and is read out a field or a frame later. The information written into the store is thus a mix between two sources: frozen video read from the store and live video. The two sources are combined according to the magnitudes of the corresponding key signals; live video gets written in where there is live key present, frozen video where there is just frozen key and live video where there are both keys. Frozen video that does not get overwritten by live video passes through the store repeatedly and hence remains in the store unchanged. As the live picture is moved there is a difference between its old position in the store and its current position The live picture now only overwrites part of the frozen image, the remainder being passed back to the store. As the movement continues a series of frozen remnants of previous live pictures is left behind which appears as a trail. The trail would pass through the store indefinitely unless some modification is made around the loop. The trail is thus caused to decay by means of the decay processor.

By incorporating in the prior arrangement a decay processor system in accordance with the invention, the above-mentioned novel decay effects may be incorporated in the known multifreeze system. Thus one system that can be achieved on a trail from a moving picture is that the body of the trail appears to sparkle as each pixel dies and then shines again on its journey to zero intensity.

BRIEF DESCRIPTION OF THE DRAWINGS

FIGS. 2A and 2B are diagrams illustrating one example of the function of a look-up table of FIG. 1.

DETAILED DESCRIPTION OF THE PREFERRED EMBODIMENT

Figure 1:
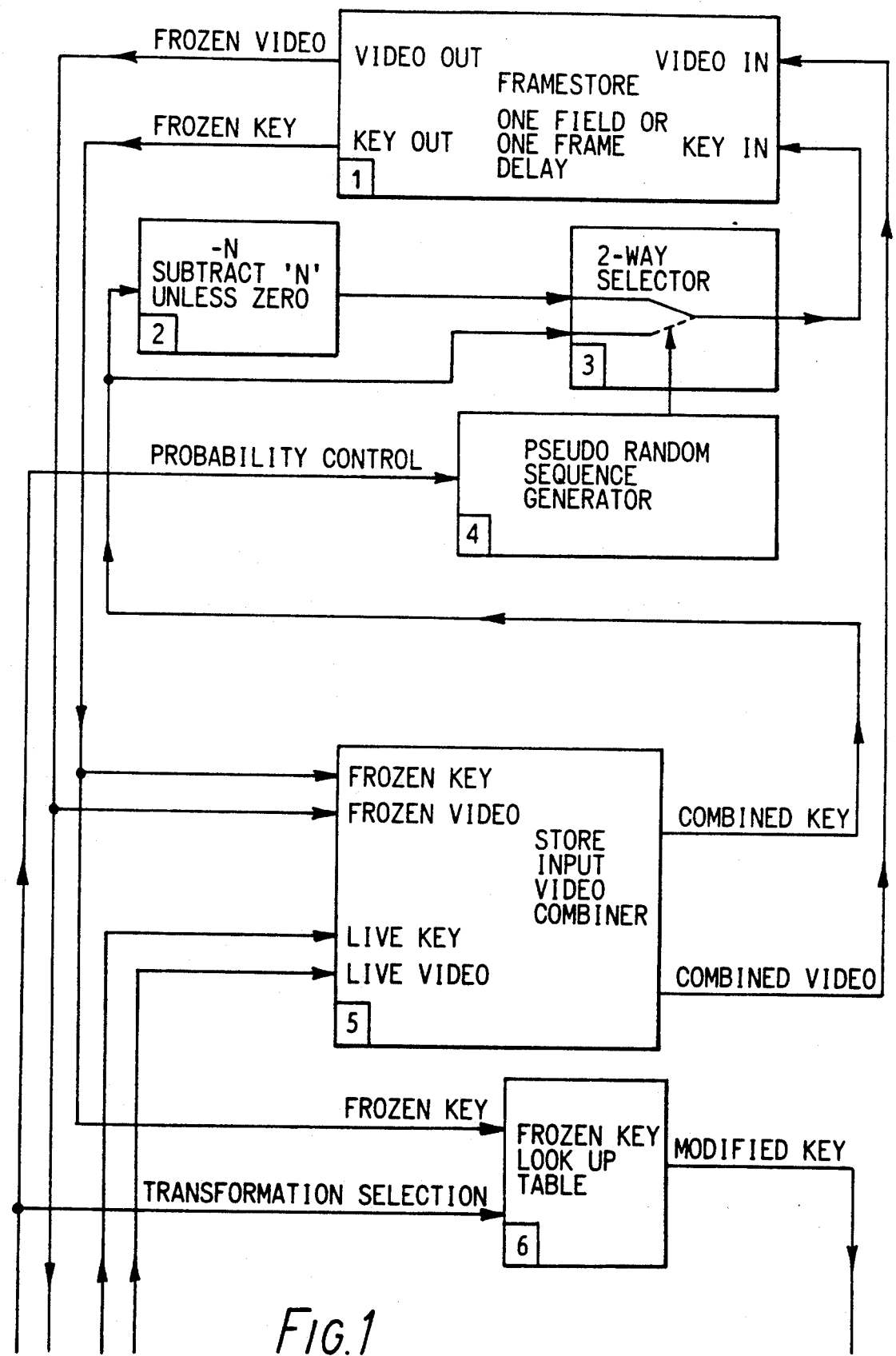
FIG. 1 is a block circuit diagram of the relevant parts of one video image processing system in accordance with the invention.
Figure 1:
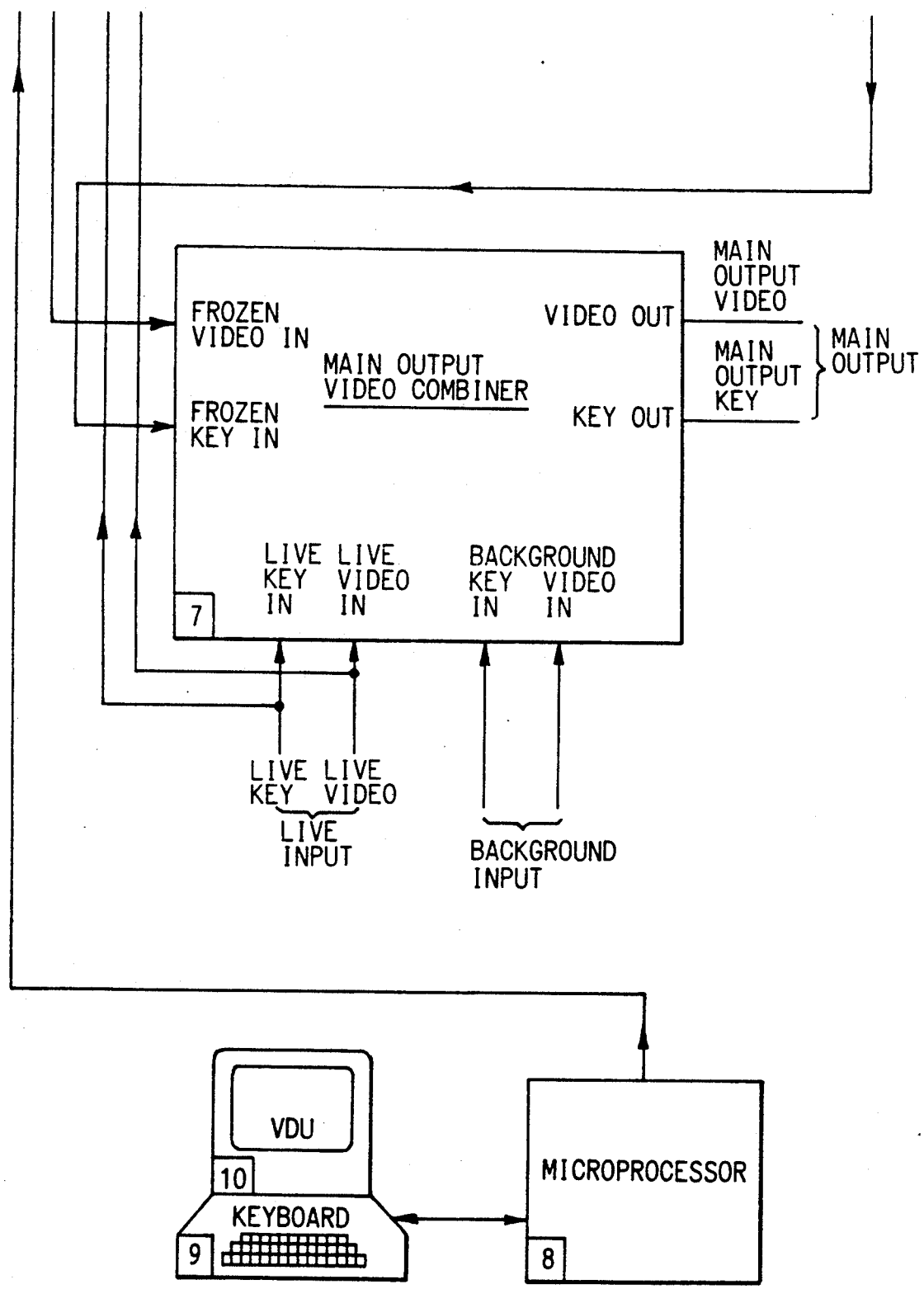

Referring to the drawing, it will be seen that the circuit of the video image processing system corresponds generally to that of the above-mentioned U.S. Pat. No. 4,918,530, and since the general operation of the circuit is similar to that of the prior document, a detailed description of the known aspects of the system will be omitted. It will be noted, however, that, in the accompanying drawing, the framestore 1 corresponds to the store 14 of the prior arrangement; the store input video combiner 5 corresponds to the element 19 of the prior arrangement; and the main output video combiner 7 corresponds to the element 4 of the prior arrangement. In the present system the element 24 of the prior arrangement is replaced by the elements 2, 3 and 4 described below, and the element 25 is replaced by the frozen key look-up table 6 referred to below. For the sake of clarity the control system 30 and the associated data busses of the prior arrangement have been omitted, but it will be appreciated that such a system is provided, as in the prior arrangment. In the arrangement illustrated herein, live video and key come into the store input combiner 5 where live video and frozen video are combined according to their key magnitudes and sent to the framestore 1. The store input combiner 5 also combines the keys for the two sources but the combined key is modified on its way to the store. The output from the store goes back to the store input combiner 5 and to the main output video keyer 7 the key being modified by the frozen key look up table 6. The main output video keyer 7 keys the frozen video with the frozen key to form the main output.

The system is controlled by a microprocessor 8 which incorporates the functions of the prior control system 30 and which also runs a program that accepts control inputs from a keyboard 9 and displays current setting on a VDU 10. This microprocessor has address and data busses which enable it to write control words to the pseudo random sequence generator 4 and to the frozen key look-up table 6 thus enabling the operator of the keyboard to control and monitor those sections.

The store input combiner 5 keys live video over frozen video so that live always gets written into the store and frozen gets circulated wherever it is not obscured by live. The combined key represents the total area of live and frozen keys and is passed to a 2-way selector 3 via two paths: one directly and the other through a subtractor 2 that reduces the value of the key by a fixed amount unless that value is zero. The two way selector 3 selects between the two paths of combined key under the control of a pseudo random sequence generator 4. The pseudo random sequence is a single bit series of ones and zeros which is random in appearance. It is controlled by the microprocessor 8, as described below, to produce different probabilities of producing a one. When the random sequence produces a one the two way selector 3 chooses the diminished combined key, otherwise it goes for the unmolested key; the effect being that a random selection of key pixels are reduced in magnitude. For information circulating through the store the cumulative effect of this process, over several fields, is that the key consists of a random pattern of intensities from full to zero. The key can only decrease, at this stage, so the general trend is downward but each pixel falls at its own pace depending on how often it gets a reduced value selected by the 2-way selector 3.

Figure 3:
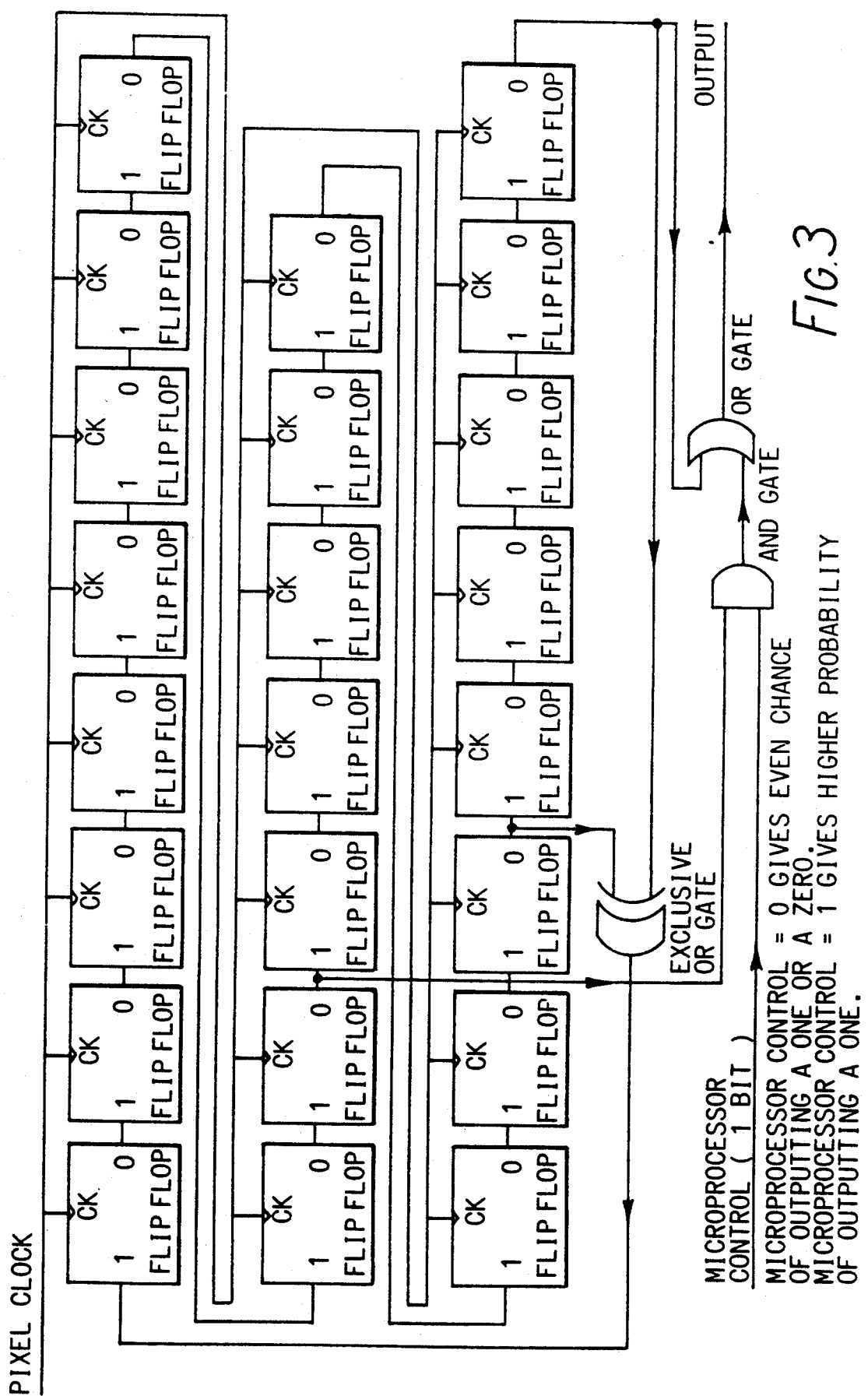
FIG. 3 is a block circuit diagram of an example of pseudo-random sequence generator of the circuit of FIG. 1.

The pseudo random sequence generator is a string of flip-flops with the output of each device connected to the input of the next as shown in FIG. 3. The first device is loaded with the logical exclusive OR of the output of the last flip-flop and the output of an intermediate one chosen to give a maximal length sequence. This arrangement gives a single bit sequence that is random in appearance. The system microprocessor controls the proportion of ones to zeros by logically ORing together the outputs from the flip-flops. For example for a larger proportion of ones the microprocessor would make the circuit logically OR together the states of 2 flip-flops to form the output whereas for an equal number of ones and zeros the microprocessor would make the circuit output the state of just one flip-flop without further modification.

This random selection of key magnitudes comes out of the store and passes to a look-up table 6 where the key signal is transformed. The look-up table is a memory device which is addressed partly by the key signal and partly by the microprocessor 8. For each microprocessor address the memory device contains a different function of the address formed by the key signal. The key signal is replaced by the contents of the memory device and so undergoes a transformation selected by the microprocessor.

An example of such key transformation that may be selected by the microprocessor is shown in FIG. 2B. Points along the curve are stored at sequential addresses in the look-up table. For a linearly decaying key signal, as depicted in FIG. 2a which addresses the look-up table the data read becomes the transformed key signal as shown in FIG. 2b. As the key corresponding to each pixel decays linearly at random intervals in time the transformed key for different pixels traverses the peaks and troughs of the curve at different times giving a dynamically changing variety of amplitudes.

This modified key is then used to key the frozen video from the store in the main output video keyer 7. The video is effectively multiplied by the key so that the pixels with a reduced key magnitude appear dimmer and those with increased key magnitude, brighter.

It will be appreciated that, within the scope of the invention, various alterations and modifications may be made to the above described embodiment, some of which are set out below.

Although the two-way selector 3 is described as being controlled by means of the psuedo random sequence generator 4, the selector could be controlled in other sequences according to the effect required. One such sequence could cause groups of pixels in the form of shapes to be decayed in a random order and another could cause shapes or individual pixels to decay in a defined order. Again the rate at which the decay takes place is determined by how frequently the subtractor path is selected.

Although the look-up table 6 is described as providing for a progressive decay of the frozen key, the profiles in the look-up table may be reversed in order to provide the effect of causing an image progressively to appear, rather than to decay.

Although the framestore 1 is arranged to give a delay of one field or frame, it could alternatively provide a delay corresponding to a multiple of fields or frames.

Although the elements 2, 3 and 4 are shown as being in the path to the input of the frame store 1, they may alternatively be included in the path from the output of the framestore.

Although a two-way selector 3 is illustrated, the selector may be arranged to select any number of paths under the control of an appropriate sequencer. Thus the subtractor 2 may be supplemented by one or more further circuits providing alternative functions of the input key signal. For example one path capable of being selected by the selector 3 may include a circuit providing for transformation of the magnitude of the key signal in order to provide an effect similar to that performed by the frozen look-up table 6. If the transformation of each key value is unique and forms the next point along a curve then the key will follow that curve as it recurses around the store.

I claim:

1. A video image processing system incorporating a decay processor for processing a key signal associated with a video image signal to be stored in, or derived from, a frame store, in order to provide for controlled decay of at least a part of a video image, wherein the decay processor incorporates a plurality of signal paths via which said key signal can be transmitted to, or derived from, the frame store, at least one of which paths incorporates decay processing means having a characteristic different from that of at least one other of said paths, and processor controlled selector switching means for selecting a corresponding path of the decay processor through which each pixel of the key signal is to be transmitted.

2. A system according to claim 1, wherein said decay processor has two signal paths one of which incorporates a subtractor that reduces the value of the key signal by a fixed amount unless the key signal value is already zero, and the other of which is a direct path that transmits the key signal unchanged.

3. A system according to claim 1, wherein said system includes a pseudo random sequence generator for controlling said processor controlled selector switching means, said generator being programmed to produce different probabilities that the respective paths of the processor controlled selector switching means will be selected.

4. A system according to claim 1, including means for controlling said processor controlled selector switching means according to a predetermined sequence.

5. A system according to claim 1 including at least one further key signal processor arranged to provide for transformation of the values of a key signal under the control of a microprocessor by means of a look-up table.

6. A system according to claim 1 comprising said frame store for receiving a video image signal together with a key signal and means for combining an incoming video image signal and an associated key signal with a video image signal and key signal retrieved from said frame store and for providing an output of said combined signals to the frame store, the said decay processor being provided in a signal path between the combining means and the frame store or vice versa.

7. A system according to claim 5 comprising said frame store for receiving a video image signal together with a key signal and means for combining an incoming video image signal and an associated key signal with a video image signal and key signal retrieved from said frame store and for providing an output of said combined signals to the frame store, the said decay processor being provided in a signal path between the combining means and the frame store or vice versa.

8. A system according to claim 7 wherein said further key signal processor is provided in one of the signal paths of said processor controlled selector switching means.

9. A system according to claim 7 comprising a further means for combining an incoming video image signal and an incoming key signal with a video image signal and a key signal derived from said frame store, said further combining means being arranged to provide main video image and key output signals form the system.

10. A system according to claim 9, wherein said further combining means is further arranged to derive background input video image and key signals and to combine said background signals in said main video image and key output signals.

11. A system according to claim 9 wherein said further key signal processor is provided in a signal path between said frame store and said further combining means.

* * * * *